United States Patent [19]

Nagasubramanian et al.

[11] Patent Number: 5,066,748

[45] Date of Patent: Nov. 19, 1991

[54] SILICON CONTAINING ELECTROCONDUCTIVE POLYMERS AND STRUCTURES MADE THEREFROM

[75] Inventors: Ganesan Nagasubramanian, La Crescenta; Salvador DiStefano, Alhambra; Ranty H. Liang, Arcadia, all of Calif.

[73] Assignee: The United States of America as represented by the Administrator of the National Aeronautics and Space Administration, Washington, D.C.

[21] Appl. No.: 479,485

[22] Filed: Feb. 7, 1990

[51] Int. Cl.$^5$ .............................................. H01B 1/00
[52] U.S. Cl. .................................... 526/258; 252/500; 252/518; 528/22
[58] Field of Search ................ 526/258, 259; 252/500, 252/518; 525/417, 540; 528/21, 22; 28

[56] References Cited

U.S. PATENT DOCUMENTS

| | | | |
|---|---|---|---|
| 4,401,545 | 8/1983 | Naarmann et al. | 252/500 |
| 4,468,291 | 8/1984 | Naarmann et al. | 252/500 |
| 4,547,270 | 10/1985 | Naarmann | 252/500 |
| 4,566,955 | 1/1986 | Naarmann | 204/59 R |
| 4,640,749 | 2/1987 | Naarmann et al. | 252/500 |
| 4,707,527 | 11/1987 | Druy et al. | 252/518 |
| 4,818,646 | 4/1989 | Takakubo et al. | 204/59 R |

OTHER PUBLICATIONS

Raychem Corp., Technical Brochure H-51946, Mar. 1983.
P. C. La Caze, J. E. Dubois, A. Desebene-Monvernay, P. A. Desebene and J. J. Bassetier, *J. Electroanal. Chem., Interfacial Electrochem.*, (1983), 148, 107.
R. N. Noufi, A. J. Nozik, J. White and L. F. Warren, *J. Electrochem. Soc.*, (1982), 129, 2261.
R. B. Kanner and A. G. MacDiarmid, *J. Chem. Soc., Faraday Trans.*, 1, (1984) 80, 2109.
G. Nagasubramamian, S. DiStefano and J. Mocanin, *J. Phys. Chem.*, 90, 4447, (1986).
A. I. Nazzali and G. B. Street, J. Chem. Soc. Commun., 375 (1985).
O. Niwa, M. Hikita and T. Tamamura, *J. Appl. Phys. Lett.*, 46, (1985).
J. C. Lacroix and A. F. Diaz in *1st International Sample Electronics Conference*, Jun. 23-25, 1987, Santa Clara, CA.
F. A. Doljack, *IEEE Transactions on Components, Hybrids and Manufacturing Technology*, vol. CHMT-4, No. 4, 372 (1981).
R. A. Simon, A. J. Ricco and M. S. Wrighton, *J. Amer. Chem. Soc.* (1982), 104, 2031-2034.

*Primary Examiner*—Josephine Barr
*Attorney, Agent, or Firm*—Thomas H. Jones; Howard W. Adams; John R. Manning

[57] ABSTRACT

An electropolymerized film comprised of polymers and copolymers of a monomer having the general formula:

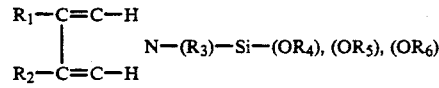

is formed on the surface of an anode. The finished structures have superior electrical and mechanical properties for use in applications such as electrostatic dissipation and for the reduction of the radar cross section of advanced aircraft.

11 Claims, 5 Drawing Sheets

SILICON CONTAINING ELECTROCONDUCTIVE POLYMERS AND STRUCTURES MADE THEREFROM

ORIGIN OF THE INVENTION

The invention described herein was made in the performance of work under a NASA contract, and is subject to the provisions of Public Law 96-517 (35 USC 202) in which the Contractor has not elected to retain title.

TECHNICAL FIELD

The present invention relates generally to novel electroconductive polymers, and more particularly, to silicon containing polymers and copolymers, and covalently bonded composite structures made therefrom.

BACKGROUND OF THE INVENTION

Conductive polymers have been the subject of intensive research for the past several decades. Currently, much work is being done to adapt these materials to such uses as the corrosion suppression of metals [1], constructing p-n heterojunctions, Schottky barrier diodes for display devices [2], liquid junction solar cells [3], the active electrode in polymeric batteries [4], electrostatic dissipation and aircraft structural materials, when a greatly reduced radar cross section is desired. For many of these purposes, the most commonly used materials are composites comprising a finely divided graphite or one or more metal powders and a polymer base. Alternatively, one or more partially conductive polymers may be compounded with a rugged support polymer. All such compositions suffer from the possibility of phase separation and, hence, non-uniform electrical properties. Furthermore, many of the polymers exhibit a lack of flexibility, low mechanical integrity and environmental instability. It is assumed that these problems largely result from the rigid conjugated polymeric backbone in conjunction with some crosslinking. One approach to enhancing these properties is the blending of the conductive polymer with a second nonconductive polymer having desirable mechanical and physical characteristics and a variety of techniques have been developed for this purpose [5,6,7]. Such composite materials are frequently found to exhibit improved film flexibility, mechanical integrity, Young's modulus, etc. without sacrificing the electroconductive characteristics of the conductive polymer [8]. However, at high temperature, metal particles tend to agglomerate [9], which precludes the use of such materials for many transportation and electrostatic dissipation applications. One class of materials in which there is much interest is based on electropolymerized homo- and copolymers of pyrrole and much work has been reported. See, for example, Naarmann et al. in a series of U.S. patents [10, 11, 12] and Druy et al. in U.S. Pat. No. 4,707,527 [13], the teaching of which patents are incorporated herein, by reference, in their entirety. In the processes disclosed in these references, it is found that the polymers can be readily stripped from the anode as a free-standing film. While such free-standing materials have good electrical characteristics, they are relatively flexible and, therefore, find limited use in applications such as in electrostatic dissipation operations and for structural applications in advanced aircraft, where a more rigid structure is required. To overcome this limitation, Simon et al. [14] have developed a two-step process for producing covalently bonded films on a metallic platinum or n-silicon substrate treated to have OH groups on the surface thereof. The disclosed process first involves covalently anchoring the silicon in a N-substituted silicon-containing pyrrole compound via reaction of surface OH groups. The pendant pyrrole functionality can then be used as the initiation point for (a second step, which is the) polymerization of pyrrole to form a film. The film is bonded to the pyrrole functionality pendant from the surface of the substrate which serves to anchor the pyrrole film to the surface. The present invention provides a one-step process for polymerizing N - substituted silicon-containing pyrrole monomers and to novel homopolymers, copolymers and composite structures made thereby.

List of Cited References

1. Raychem Corp., Technical Brochure H-51946, March 1983.
2. P. C. La Caze, J. E. Dubois, A. Desebene-Monvernay, P. A. Desebene and J. J. Bassetier, *J. Electroanal. Chem., Interfacial Electrochem. Soc.*, (1983), 148, 107.
3. R. N. Noufi, A. J. Nozik, J. White and L. F. Warren, *J. Electrochem. Soc.*, (1982), 129, 2261.
4. R. B. Kanner and A. G. MacDiarmid, *J. Chem. Soc., Faraday Trans.*, 1, (1984) 80, 2109.
5. G. Nagasubramamian, S. DiStefano and J. Mocanin, *J. Phys. Chem.*, 90, 4447, (1986).
6. A. I. Nazzali and G. B. Street, *J. Chem. Soc. Chem. Commun.*, 375 (1985).
7. O. Niwa, M. Hikita and T. Tamamura, *J. Appl. Phys. Lett.*, 46, (1985).
8. J. C. Lacroix and A. F. Diaz in *1st International Sample Electronics Conference*, June 23-25, 1987, Santa Clara, CA.
9. F. A. Doljack, *IEEE Transactions on Components, Hybrids and Manufacturing Technology*, Vol. CHMT-4, No. 4, 372 (1981).
10. H. Naarmann et al. *Electrically Conductive Pyrolle Copolymers and their Preparation*, U.S. Pat. No. 4,640,749, dated Feb. 3, 1987.
11. H. Naarmann *Preparation of Finely Divided Electrically conductive Pyrrole Polymers*, U.S. Pat. No. 4,566,955, dated Jan. 28, 1986.
12. H. Naarmann *Electrochemical Polymerization of Pyrroles, an Anode for Carrying This Out, and Products Obtained by This Procedure*, U.S. Pat. No. 4,547,270, dated Oct. 15, 1985.
13. M. A. Druy et al. *Multicomponent Systems Based on Polypyrrole*, U.S. Pat. No. 4,707,527, dated Nov. 17, 1987.
14. R. A. Simon, A. J. Ricco and M. S. Wrighton, *J. Amer. Chem. Soc.* (1982), 104, 2031-2034.

BRIEF STATEMENT OF THE INVENTION

The present invention relates to a novel polymer and to a method for polymerizing a polymeric film on a conductive substrate comprising the steps of a. under an inert atmosphere, charging an electrolytic cell having an anode and a cathode in separated anode and cathode compartments with a solution comprising a water-free solvent and an electroconductive salt, b. adding to the solution in said anode compartment an amount of one or more N - substituted, silicon-containing pyrrole monomers, said monomers having the general formula:

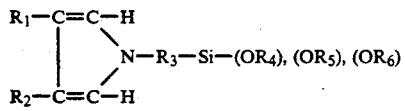

wherein $R_1$ and $R_2$ are independently selected from hydrogen, inorganic and organic radicals, $R_3$ is a divalent organic radical and $R_4$, $R_5$ and $R_6$ are, independently, monovalent organic radicals, and c. activating said electrolytic cell so that said monomer is oxidized at the anode to form a continuous, electrically conductive polymeric film on said anode.

The invention further comprises films comprised of homopolymers or copolymers of the above defined monomer as made by this method and composite structures comprised of a polymeric or copolymeric film on a conductive substrate, said composite structures having superior electrical and mechanical properties.

DETAILED DESCRIPTION OF THE INVENTION

Figure 1:
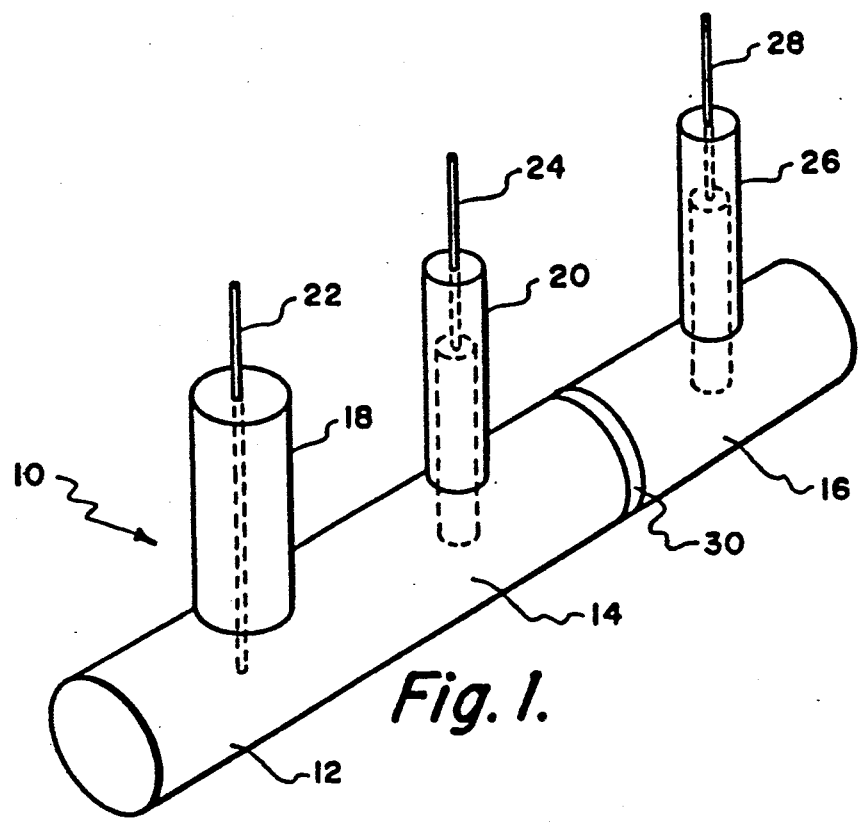
FIG. 1 is a schematic drawing of a typical electrolytic cell as used in the present invention.

The present invention relates to a process for polymerizing N - substituted silicon containing monomers to form N - substituted silicon-containing polypyrrole polymers. Present invention comprises one or more electropolymerized polymers having the following general structure:

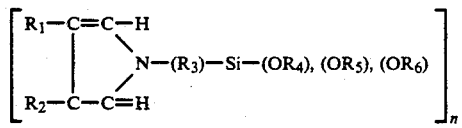

where n is an integer such that a high solid polymeric film is formed $R_1$ and $R_2$ in the pyrrole ring are independently selected from hydrogen, inorganic radicals or organic substituents having up to about 14 carbon atoms, and $R_3$, $R_4$, $R_5$ and $R_6$ are each separately and independently organic radicals. The electropolymerization process of the present invention can accomplish the concurrent covalent bonding of said polymers to an underlying conductive support structure, i.e. the anode of the cell.

As used herein, the term "substituted" shall be taken to mean that a hydrogen attached to a carbon atom is replaced with a substituent such as a thio, hydroxy, nitro, amino or halogen group, or by an organic radical. The term "organic radical" broadly refers to any carbon containing radical. Such radicals may be cyclic or acyclic, have straight or branched chains and in addition to being substituted or unsubstituted, can contain one or more carbonyl or nitrile groups and/or hetero atoms such as sulfur, nitrogen, oxygen, phosphorus, and the like. In addition to aliphatic chains, such radicals may contain aryl groups, including arylalkyl and alkylaryl groups, and cycloalkyl groups, including alkyl-substituted cycloalkyl groups and cycloalkyl-substituted alkyl groups, with such groups, if desired, being substituted with any of the substituents listed herein. When cyclic groups are present, whether aromatic or nonaromatic, it is preferred that they have only one ring. It is preferred for all such radicals that they be free of olefinic or alkynyl unsaturation. Preferred for $R_3$ are divalent aliphatic, preferably alkyl radicals having from 1 to about 10 carbon atoms, cycloalkyl radicals having from 4 to about 7 carbon atoms and phenyl radicals, preferably joined to the nitrogen and silicon containing moiety in the para position. Most preferred are unbranched, unsubstituted alkyl radicals having from 2 to about 6 carbon atoms.

Preferred for $R_4$, $R_5$ and $R_6$ are monovalent organic radicals comprised of cycloalkyl groups, straight or branched alkyl groups having from 1 to about 7 carbon atoms, and phenyl groups, all of said groups being preferably unsubstituted. More preferred for $R_4$, $R_5$ and $R_6$ are unsubstituted straight or branched chain alkyl groups having no more than 3 carbon atoms. Most preferred is a compound wherein $R_1$ and $R_2$ are hydrogen, $R_3$ is propyl (3 carbon atoms) and each of $R_4$, $R_5$ and $R_6$ is a methyl group, i.e, N-[3-(trimethoxysilyl) propyl] pyrrole. However, whichever monomer, as defined above, is chosen, it is found that the silyl group, —Si—$(OR)_3$, readily hydrolyses in the presence of water to —Si—$(OH)_3$. Consequently, the monomer should be kept at all times in a closed container and under a dry, inert atmosphere.

In an electropolymerization process used to prepare the conductive polymers of the present invention, the selected monomer can be electrolyzed in a cell (shown schematically in FIG. 1) containing a solution comprising a water-free organic solvent and a conductive salt, the polymer being formed as a result of anodic oxidation and being covalently bonded onto the anode as a continuous film. In addition to being water-free, the solvent is also inert in the presence of, and nonreactive with, the silyl group. Suitable solvents meeting these criteria are pure saturated aliphatic, cycloalkyl and aromatic hydrocarbons and saturated ester and nitrile derivatives thereof. Solvents which are liquid in the temperature range of from about 0° to about 50° C. are preferred. Useful conductive salts are alkali metal, ammonium, tertiary or quaternary ammonium or phosphonium salts containing anions from the group consisting of $BF_4^-$, $AsF_6^-$, $SbF_6^-$, $PF_6^-$ and $ClO_4^-$. Particularly preferred are salts in which the cation is selected from the group consisting of tertiary and quaternary substituted ammonium and phosphonium groups which are substituted with alkyl groups having no more than 6 carbon atoms or phenyl groups, i.e., tetramethyl ammonium, tetraethyl ammonium, tetra n-butyl ammonium, triphenyl phosphonium and tri n-butyl phosphonium salts, since these will dissolve and ion-ize in the solvent so that a current may be conducted through the cell. In use, these salts are partially or completely incorporated into the polymer, probably being bonded in the form of a complex, and impart an electrical conductivity on the order of about $10^2 \, ohm^{-1} cm^{-1}$ to the finished polymer. The amount of electrolyte used is typically in the range of about 0.01 to about 1.0 gram equivalent/liter. Preferably, however, it is in the range between about 0.05 to about 0.2 gram equivalent /liter. To produce electroconductive polymers according to the present invention, it is preferable that the concentration of the monomer used be in the range of about 0.001 to about 0.5 moles/ liter, more preferably in the range of about 0.01 to about 0.2 moles/liter.

The polymerization can be performed in an ordinary electrolytic cell or in an apparatus used for electrolysis. Such a cell is shown schematically in FIG. 1. As shown, cell 10 comprises a body 12, separated into anode and cathode compartments 14 and 16 respectively. Anode compartment 14, into which the monomer is placed prior to the start of electrolysis, further comprises 2 arms, 18 and 20 respectively. Arm 18 is adapted to support an optional reference electrode 22, while arm 20 contains an anode 24 at which the electropolymerization reaction occurs. Cathode compartment 16 comprises an arm 26 which contains the cathode 28. Since the electropolymeric reaction is an oxidation process, body 12 preferably contains a porous separator 30, such as fitted glass to separate the oxidized film on the anode from the reduction products produced at the cathode during electrolysis. In order to accurately maintain the anode potential during the reaction, the apparatus for electrolysis is preferably provided with a reference electrode.

For the anode and cathode any conventional relatively inert electrode material such as gold, platinum, nickel, copper or graphite may be used. Preferred for the cathode, however, is platinum gauze; while for the anode, materials such as glassy carbon (GC) or a conductive oxide composites such as indium-tin-oxide (ITO) deposited on glass are preferred. Such anodic materials are commercially available and can be readily shaped into finished parts for a variety of end product uses prior to having the polymer film deposited thereon. Prior to use, carbon and metal anodes are polished to a surface finish of about 1 micron or less and all materials are cleaned and degreased with a volatile solvent such as acetone. Other than storing the thus cleaned anode materials in an inert atmosphere to prevent surface oxidation and airborne contamination from depositing thereon, no other special treatment is needed prior to use in the cell as the conductive substrate for the deposited electroconductive film.

To prevent any airborne moisture-induced hydrolysis of the silyl group, the electrolysis is performed under an inert atmosphere of argon, helium or nitrogen. In this operation, it is preferred that the difference in potential between the anode and cathode be 6 V or less, more preferably 3 V or less, and that the difference in the potential between the anode and the reference electrode be maintained to be at least about 0.70 V, more preferably between about 0.70 and 1.0 V, and most preferably between about 0.75 and about 0.95 V.

The temperature at which the electrolysis is performed may be varied anywhere between the freezing point and the boiling point of solution used for the reaction. However, to avoid problems, on one hand, with decreased viscosity or solidification of the solvent and a reduced solubility of the monomer therein at very low temperatures, and with excessive solvent vapor pressure, on the other, it is preferred that the temperature used in the process of the present invention be between about 0° and about 50° centigrade, more preferred that it be between about 15° and about 35° centigrade. The polymerization reaction may be performed by either the potentiostatic method or the galvanostatic method.

The reaction time mainly depends on the solvent-/electrolyte system employed, the reaction conditions and the desired thickness of the polymeric film. Typically, reaction times are between about 1 and about 8 hours, with the thickness usually increasing at a rate of between about 1 and about 2 microns per hour. For many applications, the final thickness of the polymer film should be in the range between about 5 and about 15 microns.

At the completion of the electrolysis, the film coated anode is removed and washed with a water free solvent as defined above to remove any unreacted monomer remaining thereon. Examination of the film shows it to be tightly adherent to the underlying anode structure. Such a composite structure can, therefore, be used directly in many of the applications discussed above. To protect the outer surface of the film it may be protected with an inert coating. One such material is a coating based on solvent based vinylidene chloride. Those of skill in the art will recognize other suitable coating materials.

In a second embodiment of the present invention, the above defined N-substituted, silicon containing pyrrole can also be copolymerized, preferably with pyrrole, to form electroconductive films. In addition to pyrrole, the following pyrrole derivatives can also be employed: 3-methyl pyrrole, 3-ethyl pyrrole, 3-n-propyl pyrrole, 3-n-butyl pyrrole, 3-decyl pyrrole, 3-benzyl pyrrole, 3-cyclohexyl pyrrole, 3-methoxy pyrrole, 3-ethoxy pyrrole, 3,4-dimethyl pyrrole, 3,4-diethyl pyrrole, 3,4-di-n-propyl pyrrole, 3,4 didodecyl pyrrole, 3,4-dipropoxy pyrrole, 3,4-difuryl pyrrole, N-methyl pyrrole, N-ethyl pyrrole, N-n-propyl pyrrole, N-n-butyl pyrrole, N-phenyl pyrrole, N-(p-tolyl) pyrrole, 3-chloro pyrrole, 3-bromo pyrrole, 3-iodo pyrrole, 3,4-dichloro pyrrole, 3,4-dibromo pyrrole and 3,4-diiodo pyrrole. When any of the above pyrrole derivatives is used as a comonomer, it is preferable that the amount of comonomer be in the range from about 25 to about 75 weight percent, more preferably from about 30 to about 60 weight percent, of the entire monomeric charge in the cell. When polymerized as described above, both IR and 2-probe electrical conductivity measurements show that the resultant film is a copolymer of the two reactants and not a dispersion of one polymer in the matrix of the other. It is noted that the 3, 4 substituents in these compounds can serve as $R_1$ and $R_2$, and that the N - substituents can serve as $R_3$ in the primary silicon-containing monomer defined herein.

The invention is further described by the following examples which are illustrative of specific modes of practicing the invention and are not intended as limiting the scope of the invention as defined in the claims.

EXAMPLES

1. In an argon filled glove box, a two-compartment cell of about 15 ml capacity as shown in FIG. 1 was provided with a quasi reference silver electrode and a cleaned and polished glassy carbon anode having a surface of less than about 1 micron in one compartment and a platinum gauze cathode having a surface area of >40 cm$^2$ in the other. About 14 cc of a 0.1 M solution comprising tetra n-butyl ammonium perchlorate (TBAP) dissolved in acetonitrile was placed in the cell. Prior to use, both materials were reacted with activated alumina (Woelm neutral alumina, activity super I, Woelm Pharma GmbH and Co. Eschwege, Germany) to remove any water therein. Next, an amount of pyrrole sufficient to provide an initial concentration of about 0.1 gram M was added to the solution in the anode compartment. Polymerization was then started potentiostatically at a potential of about 0.8 V and continued until a film having a thickness of approximately 10 microns was deposited thereon. At the conclusion of the electrolysis, the polymer coated glassy carbon anode was removed from the cell and washed with water-free acetonitrile to remove any residual unreacted monomer. The film was found to be tightly bonded to the GC substrate.

Before and after electrolysis, the potential between the quasi reference silver electrode was measured against that of an aqueous saturated calomel electrode outside the glove box and it was found that essentially no change had occurred.

The above procedure was repeated with pyrrole being replaced with (1) N-[3-(trimethoxysilyl) propyl] pyrrole, and (2) a 1:1 comonomeric mixture of pyrrole and N-[3-(trimethoxysilyl) propyl] pyrrole with essentially similar results. In the Example following, the two homopolymers are identified as A and B respectively, while the copolymer is identified as AB.

2. The 3 GC/polymer composite structures of Example 1 were each subjected to cyclic voltametric measurements using a Princeton Applied Research (PAR) model 173 potentiostat, a PAR model 175 universal programmer and a Soltec Model 6432 X - $X_1Y_2$ recorder, at a scan rate of about 20 mV/second. Although the current scales are comparable, the shapes of the B and AB curves show an irregular hysteresis effect, with the overall effect shown with the AB is polymer being significantly greater than that shown by the B polymer, while that of the A polymer is substantially symmetrical above and below the voltage reference line. The difference between the A polymer and the B and AB polymers suggests that the diffusion of anions within the polymer matrix may be significantly different for these polymers.

Figure 3A:
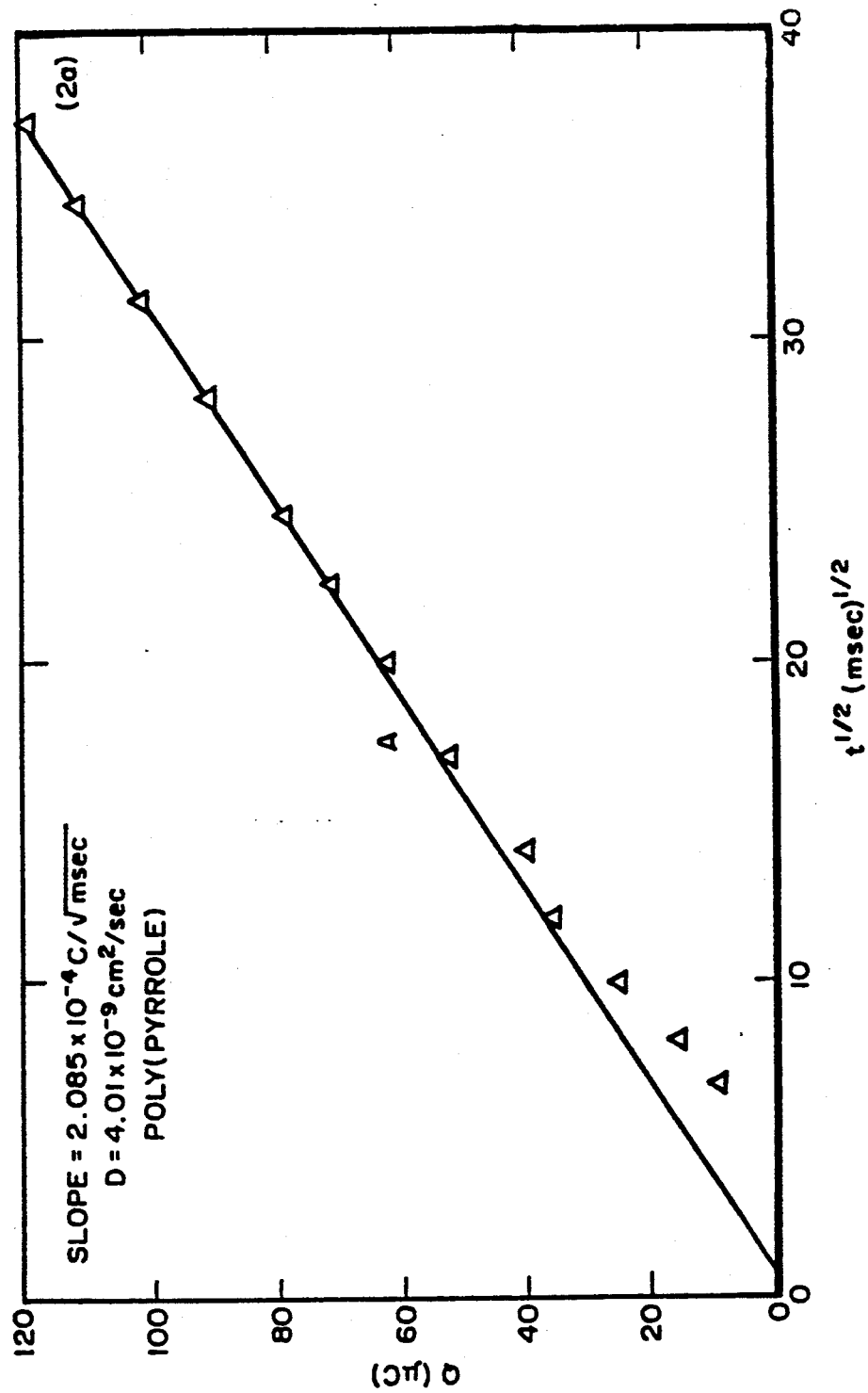
FIG. 3A is a Cottrell plot of Q vs $t^{\frac{1}{2}}$ for pyrrole.
Figure 3B:
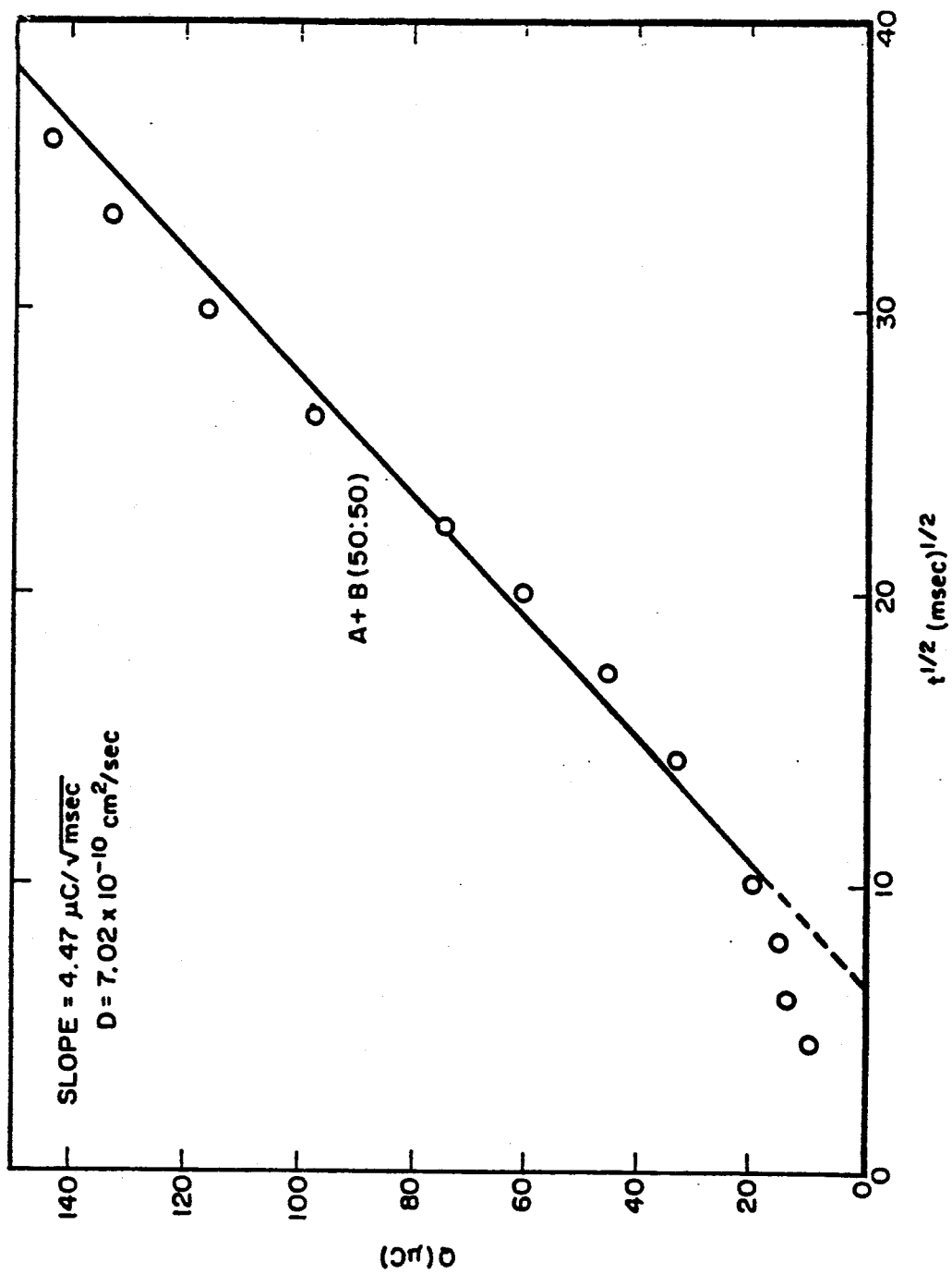
FIG. 3B is a Cottrell plot of Q vs $t^{\frac{1}{2}}$ for the copolymer of the invention.
Figure 3C:
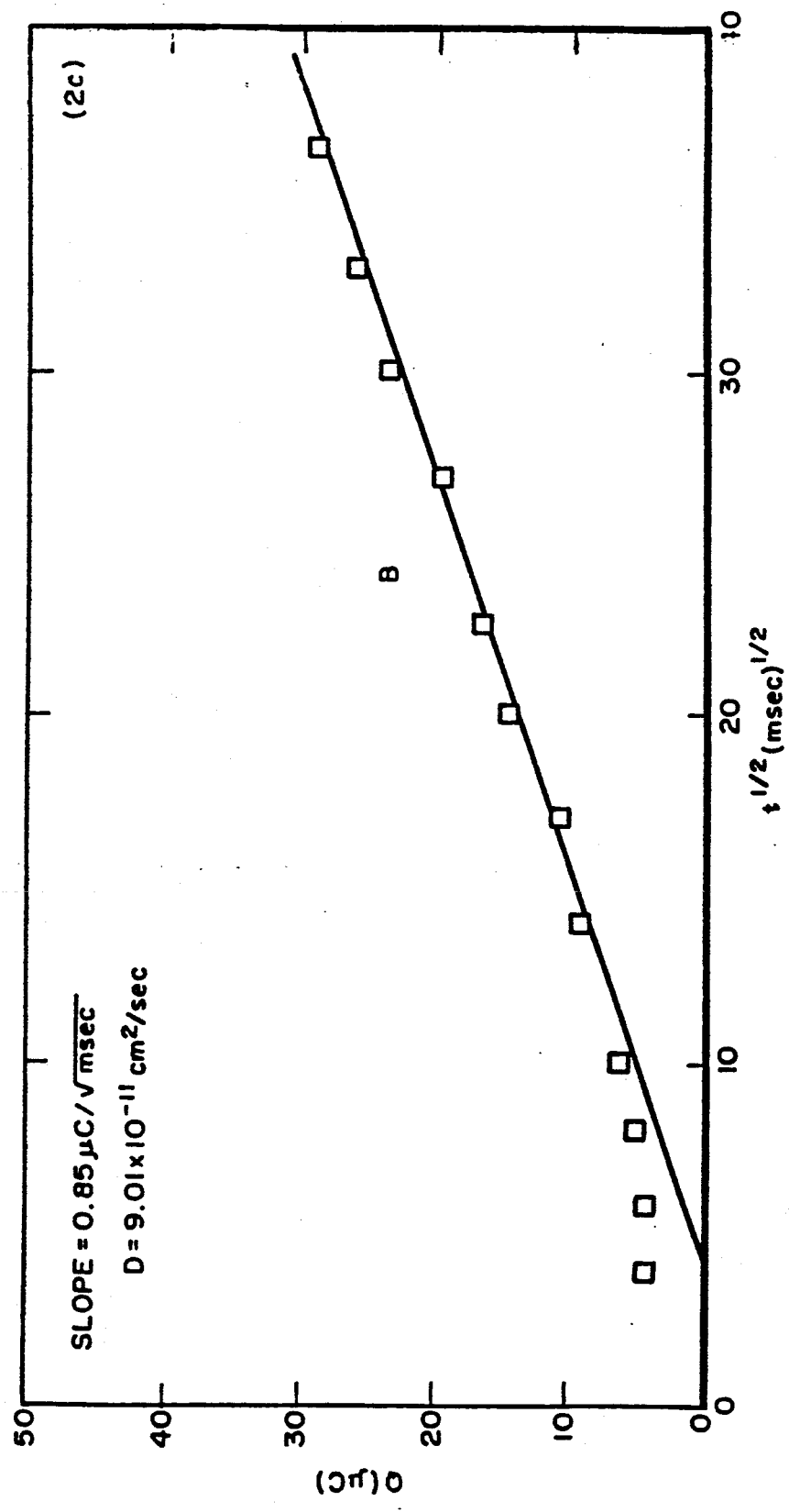
FIG. 3C is a Cottrell plot of Q vs $t^{\frac{1}{2}}$ for the homopolymer of the invention.

The apparent diffusion coefficient, $D_{app}$, of the anion, $ClO_4$, was obtained from chronocoulometric measurements by stepping the voltage to a point where the voltage drop across the film is such that the heterogeneous electrontransfer rate is fast, and the current/time response recorded. Where a semi-infinite boundary exists and $D_{app}$ is uniform throughout the film, the current transient at short-time can be described by the Cottrell equation:

Q(in coulombs)=$2nFA*t^{\frac{1}{2}}*D_{app}*c/(pi)^{\frac{1}{2}}$ wherein *c is the initial concentration of electroactive sites in the film of area A ($cm^2$) and F and n are the Faraday constant and the number of electrons transferred respectively. From the slope of the plot of Q vs. $t^{1/2}$, the $D_{app}$ can be obtained. Measurements of Q were made on the polymer coated glassy carbon substrates, as made in Example 1, being immersed in fresh acetonitrile/TBAP solution, with the potential of the working electrode being held at 0 V and with the charge necessary to completely reduce the film ($Q_{red}$) being monitored. The concentration of $ClO_4$ (which corresponds to *c in the Cottrell equation) can be computed from the charge $Q_{red}$, taking the thickness of the polymer film and using the area of the electrode. Plots of Q vs. $t^{\frac{1}{2}}$ are shown in FIGS. 3A, 3B and 3C. The computed values of the average values of $Q_{red}$ and $D_{app}$ taken from replicate measurements with 4 separate polymer films are given in Table I.

TABLE I

| Polymer | $Q_{tot}$ (mc) | $Q_{red}$ (mc) | $D_{app}$ ($cm^2$/sec) |
|---------|----------------|----------------|------------------------|
| A       | 50             | 3.51 ± 0.05    | 4.1 ± 0.5 × $10^{-9}$  |
| AB      | 50             | 3.24 ± 0.06    | 7.1 ± 0.3 × $10^{-10}$ |
| B       | 50             | 3.01 ± 0.03    | 9.2 ± 0.6 × $10^{-11}$ |

Electrode area = 0.05 $cm^2$.

As can be seen, the $D_{app}$ varies as A>AB>B.

Figure 2:
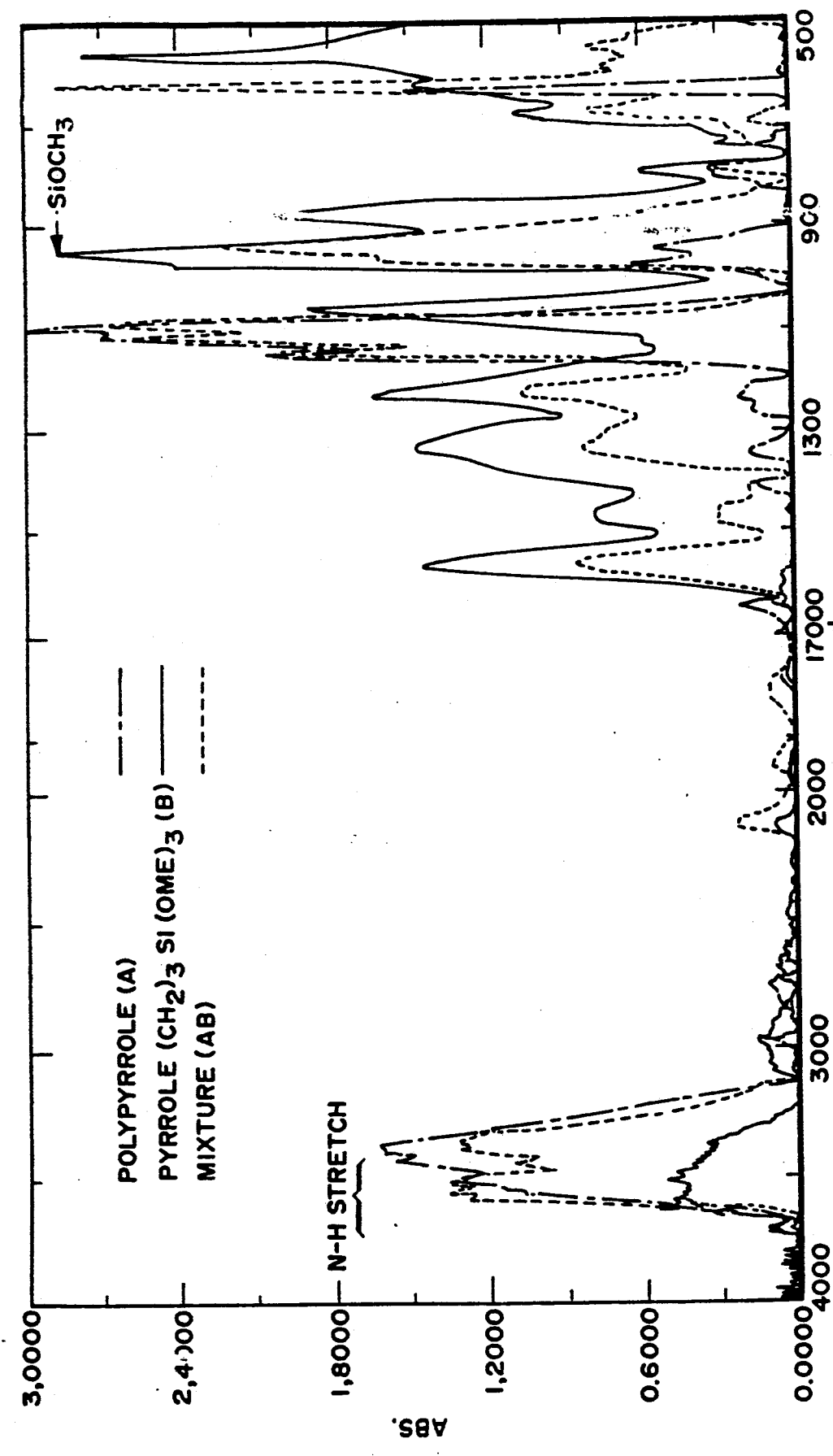
FIG. 2 shows the IR spectra of the polymers of the invention when deposited onto an indium-tin-oxide/-glass substrate.

3. The infrared spectra of polymers A, AB and B as deposited onto an ITO/ glass composite are shown in FIG. 2. This shows the characteristic frequency around 1000 $cm^{-1}$ for Si—O—$CH_3$ in the spectra for polymers B and AB and the increase in the peak corresponding to N—H, at 3500 $cm^{-1}$, in the progression from polymer B to polymer A. Soaking copolymer film AB in a good solvent (acetonitrile) for the individual monomers, failed to cause any changes in the observed spectrum, thus indicating that the monomers are chemically locked in as a copolymer and not dispersed as monomers in the polymer matrix of the other.

Figure 4:
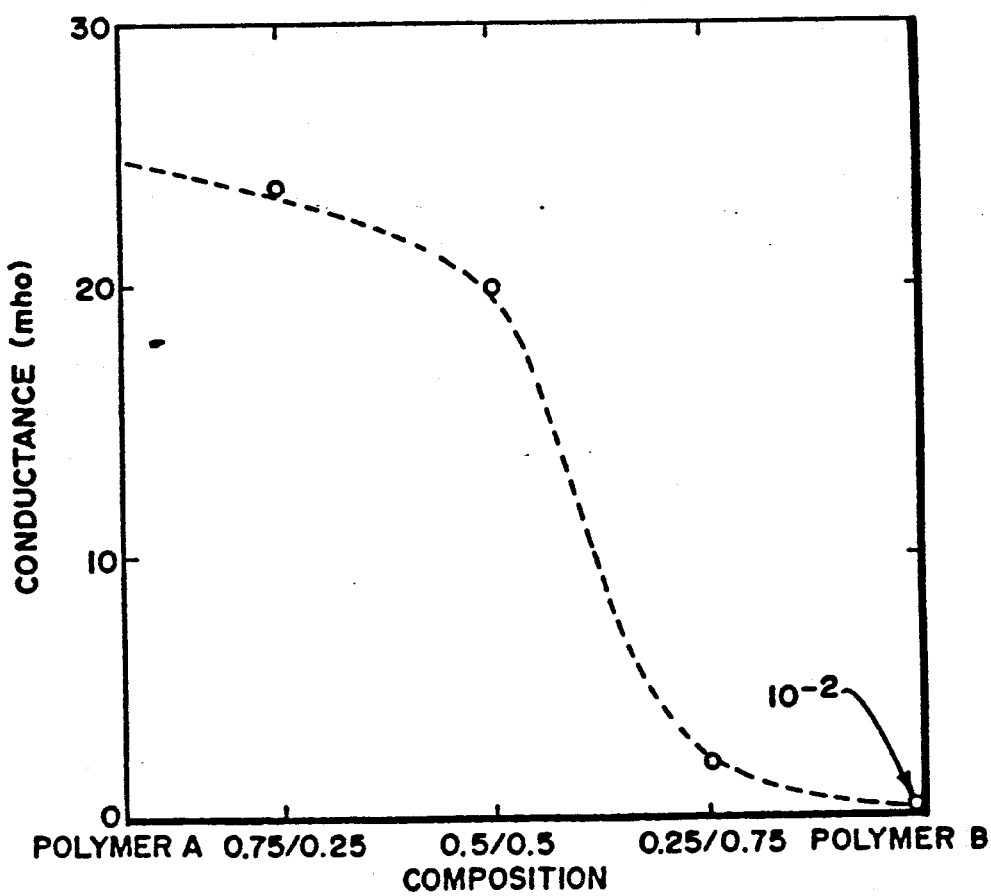
FIG. 4 is a plot of the conductance vs composition of the copolymers of the invention.

4. Two probe conductivity measurements of polymers A and B and copolymers corresponding 0.75 A/0.25 B, 0.50 A/0.50 B and 0.25 A/0.75 B were made by ramping the potential at 20 mV/sec and recording the current. FIG. 4 shows the conductance, in mhos, as a function of composition. Conductivity values can be obtained by multiplying the by 2.4×$10^{-2}$. Similar conductance values were obtained with films soaked in acetonitrile for several hours. Such results tend to confirm that the combination of polymers is a true copolymer.

The invention may be embodied in other specific forms without departing from the spirit or essential characteristics thereof. The present embodiments and examples are, therefore, to be considered in all respects as illustrative and not restrictive, the scope of the invention being indicated in the appended claims, and all changes which come within the scope and equivalency of the claims are, therefore, intended to be embraced therein.

We claim:

1. A solid polymer of the formula:

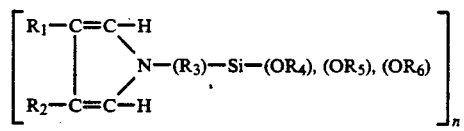

where n is an integer such that the polymer is a solid, $R_1$ and $R_2$ are independently selected from hydrogen or organic substituents, containing up to 14 carbon atoms which are free of olefinic or alkynyl unsaturation, $R_3$ is a divalent organic radical selected from the group consisting having from 4 to about 7 atoms and phenyl groups, and $R_4$, $R_5$ and $R_6$ are independently selected from the group consisting of unsubstituted phenyl groups, unsubstituted cycloalkyl containing 1 to 7 carbon atoms and straight or branched alkyl group having from 1 to about 7 carbon atoms.

2. The polymer of claim 1 further including from 25 to 75% of randomly polymerized pyrrole comonomer.

3. The polymer of claim 2 in which the pyrrole comonomer is selected from halopyrrole, or $C_7$ to $C_{14}$ alkyl, alkoxy, aryl or aralkyl substituted pyrrole.

4. The polymer of claim 3 in which the comonomer is selected from the group consisting of pyrrole, 3-methyl pyrrole, 3-ethyl pyrrole, 3-n-propyl pyrrole, 3-n-butyl pyrrole, 3-decyl pyrrole, 3-benzyl pyrrole, 3-cyclohexyl pyrrole, 3-methoxy pyrrole, 3-ethoxy pyrrole, 3,4-dimethyl pyrrole, 3,4-diethyl pyrrole, 3,4-di-n-propyl pyrrole, 3,4 didodecyl pyrrole, 3,4-dipropoxy pyrrole, 3,4-difuryl pyrrole, 3-chloro pyrrole, 3-bromo pyrrole, 3-iodo pyrrole, 3,4-dichloro pyrrole, 3,4-dibromo pyrrole and 3,4-diiodo pyrrole.

5. The polymer of claim 1 in which $R_1$ and $R_2$ are both hydrogen.

6. The polymer of claim 1 wherein $R_3$ is an unsubstituted, unbranched alkylene group having from 2 to about 6 carbon atoms.

7. The polymer of claim 6 wherein $R_3$ has 3 carbon atoms.

8. The polymer of claim 1 wherein $R_4$, $R_5$ and $R_6$ are unsubstituted straight or branched chain alkyl groups having no more than 3 carbon atoms.

9. The polymer of claim 1 wherein $R_1$ and $R_2$ are hydrogen, $R_3$ is propylene and each of $R_4$, $R_5$ and $R_6$ is a methyl group.

10. A free standing film formed of the polymer defined in claim 1.

11. A film according to claim 10 having a thickness up to 15 microns.

* * * * *